(12) United States Patent
Hirano et al.

(10) Patent No.: US 12,362,394 B2
(45) Date of Patent: Jul. 15, 2025

(54) SECONDARY BATTERY

(71) Applicant: MURATA MANUFACTURING CO., LTD., Kyoto (JP)

(72) Inventors: Yuta Hirano, Kyoto (JP); Takaaki Matsui, Kyoto (JP); Swati Devi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 513 days.

(21) Appl. No.: 17/948,555

(22) Filed: Sep. 20, 2022

(65) Prior Publication Data

US 2023/0020044 A1 Jan. 19, 2023

Related U.S. Application Data

(63) Continuation of application No. PCT/JP2020/042442, filed on Nov. 13, 2020.

(30) Foreign Application Priority Data

Mar. 24, 2020 (JP) ................. 2020-052236

(51) Int. Cl.
*H01M 10/0569* (2010.01)
*H01M 10/0525* (2010.01)
*H01M 10/0567* (2010.01)

(52) U.S. Cl.
CPC ... *H01M 10/0569* (2013.01); *H01M 10/0525* (2013.01); *H01M 10/0567* (2013.01); *H01M 2300/0028* (2013.01)

(58) Field of Classification Search
CPC ................. H01M 10/0567; H01M 10/0569
See application file for complete search history.

(56) References Cited

U.S. PATENT DOCUMENTS

2004/0229128 A1 11/2004 Noh
2005/0287442 A1 12/2005 Kim et al.
(Continued)

FOREIGN PATENT DOCUMENTS

CN 103346349 A 10/2013
JP 2004342585 A 12/2004
(Continued)

OTHER PUBLICATIONS

International Search Report of corresponding PCT application PCT/JP2020/042442, dated Jan. 19, 2021.
(Continued)

*Primary Examiner* — Sarah A. Slifka
(74) *Attorney, Agent, or Firm* — K&L Gates LLP

(57) ABSTRACT

A secondary battery includes: a positive electrode; a negative electrode including a negative electrode active material layer on which a film including an organic substance is formed; and an electrolytic solution including a sulfur-containing cyclic compound, a fluorinated cyclic carbonic acid ester, an unsaturated cyclic carbonic acid ester, and a multi-nitrile chain compound. According to a mass analysis of the electrolytic solution using gas chromatography-mass spectrometry, a content of the sulfur-containing cyclic compound, a content of the fluorinated cyclic carbonic acid ester, a content of the unsaturated cyclic carbonic acid ester, and a content of the multi-nitrile chain compound in the electrolytic solution each satisfy the following relation: the content of the multi-nitrile chain compound>the content of the fluorinated cyclic carbonic acid ester>the content of the sulfur-containing cyclic compound>the content of the unsaturated cyclic carbonic acid ester, and the total sum of those contents is greater than or equal to 5.0 wt % and less than or equal to 11.0 wt %.

6 Claims, 2 Drawing Sheets

(56) References Cited

U.S. PATENT DOCUMENTS

| | | |
|---|---|---|
| 2010/0119955 A1 | 5/2010 | Abe et al. |
| 2011/0229770 A1 | 9/2011 | Yun et al. |
| 2016/0218390 A1 | 7/2016 | Yamada et al. |
| 2017/0040639 A1 | 2/2017 | Wang et al. |
| 2017/0084956 A1 | 3/2017 | Zhuang |

FOREIGN PATENT DOCUMENTS

| | | |
|---|---|---|
| JP | 2006012806 A | 1/2006 |
| JP | 2009110943 A | 5/2009 |
| JP | 2011192632 A | 9/2011 |
| JP | 2013065540 A | 4/2013 |
| JP | 2016048624 A | 4/2016 |
| JP | 2016143449 A | 8/2016 |
| JP | 2017063019 A | 3/2017 |
| WO | 2008093837 A1 | 8/2008 |
| WO | 2015045386 A1 | 4/2015 |

OTHER PUBLICATIONS

Kerner, M., et al. Towards more thermally stable Li-ion battery electrolytes with salts and solvents sharing nitrile functionality, Journal of Power Sources, Sep. 29, 2016, vol. 332, pp. 204-212, abstract.

SECONDARY BATTERY

CROSS REFERENCE TO RELATED APPLICATIONS

The present application is a continuation of PCT patent application no. PCT/JP2020/042442, filed on Nov. 13, 2020, which claims priority to Japanese patent application no. JP2020-052236, filed on Mar. 24, 2020, the entire contents of which are herein incorporated by reference.

BACKGROUND

The present application relates to a secondary battery.

Various electronic apparatuses such as mobile phones have been widely used. Such widespread use has promoted the development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, to improve a characteristic such as a cyclability characteristic, a fluorinated cyclic carbonic acid ester (a cyclic carbonate having a halogen atom) and an unsaturated cyclic carbonic acid ester (a cyclic carbonate having an unsaturated bond) are included as additives in the electrolytic solution. As other additives to be included in the electrolytic solution, a sulfur-containing cyclic compound (such as 1,3-propane sultone) and a dinitrile compound (a compound represented by NC—R—CN) have been used. In these cases, a content of each additive is specified, and a total sum of the contents of these additives is also specified.

SUMMARY

The present application relates to a secondary battery. Although consideration of a performance of a secondary battery has been given in various ways, there is room for improvement as an electric resistance characteristic of the secondary battery still remains insufficient.

The present technology has been made in view of such an issue, and relates to providing a secondary battery that makes it possible to achieve a superior electric resistance characteristic according to an embodiment.

A secondary battery according to an embodiment of the present technology includes: a positive electrode; a negative electrode including a negative electrode active material layer on which a film including an organic substance is formed; and an electrolytic solution including a sulfur-containing cyclic compound, a fluorinated cyclic carbonic acid ester, an unsaturated cyclic carbonic acid ester, and a multi-nitrile chain compound.

According to a mass analysis of the electrolytic solution using gas chromatography-mass spectrometry (GC/MS), a content of the sulfur-containing cyclic compound, a content of the fluorinated cyclic carbonic acid ester, a content of the unsaturated cyclic carbonic acid ester, and a content of the multi-nitrile chain compound included in the electrolytic solution each satisfy the following relation: the content of the multi-nitrile chain compound>the content of the fluorinated cyclic carbonic acid ester>the content of the sulfur-containing cyclic compound>the content of the unsaturated cyclic carbonic acid ester, and a total sum of the content of the sulfur-containing cyclic compound, the content of the fluorinated cyclic carbonic acid ester, the content of the unsaturated cyclic carbonic acid ester, and the content of the multi-nitrile chain compound is greater than or equal to 5.0 wt % and less than or equal to 11.0 wt %.

According to an elemental analysis of the film using X-ray photoelectron spectroscopy (XPS) in a range from a surface to a depth of 20 nm, an element concentration of carbon is greater than or equal to 80 at % and less than or equal to 94 at %.

The phrase "the negative electrode including a negative electrode active material layer on which a film including an organic substance is formed" described above means that the secondary battery has been charged and discharged for one or more cycles after being assembled, i.e., the secondary battery has undergone a stabilization process to be described later after being assembled. The stabilization process is a charging and discharging process for forming the film including the organic substance on the surface of the negative electrode active material layer. Note that the stabilization process will be described in detail later.

The term "sulfur-containing cyclic compound" is a generic term for a cyclic compound including one or more sulfur atoms as a constituent elements. The term "fluorinated cyclic carbonic acid ester" is a generic term for a cyclic carbonic acid ester including one or more fluorine atoms as a constituent element. The term "unsaturated cyclic carbonic acid ester" is a generic term for a cyclic carbonic acid ester including one or more unsaturated bonds (carbon-carbon double bonds). The term "multi-nitrile chain compound" is a generic term for a chain compound including two or more cyano groups. Note that the sulfur-containing cyclic compound, the fluorinated cyclic carbonic acid ester, the unsaturated cyclic carbonic acid ester, and the multi-nitrile chain compound will each be described in detail later.

According to the secondary battery of an embodiment, the electrolytic solution includes the sulfur-containing cyclic compound, the fluorinated cyclic carbonic acid ester, the unsaturated cyclic carbonic acid ester, and the multi-nitrile chain compound, and the film including the organic substance is formed on the surface of the negative electrode active material layer. In addition, a series of conditions regarding the mass analysis of the electrolytic solution using GC/MS and the elemental analysis of the film using XPS are satisfied. Accordingly, it is possible to obtain a superior electric resistance characteristic.

Note that effects of the present technology are not necessarily limited to the effects described herein and may include any of a series of suitable effects in relation to the present technology.

DETAILED DESCRIPTION

The present technology is described in further detail below including with reference to the drawings.

First, a description is given of a secondary battery according to an embodiment of the present technology.

The secondary battery described here is a secondary battery that obtains a battery capacity by utilizing insertion and extraction of an electrode reactant. The secondary battery includes a positive electrode, a negative electrode, and an electrolytic solution that is a liquid electrolyte. In the secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

The electrode reactant is not limited to a particular kind. Specifically, the electrode reactant is a light metal such as an alkali metal or an alkaline earth metal. Specific examples of the alkali metal include lithium, sodium, and potassium. Specific examples of the alkaline earth metal include beryllium, magnesium, and calcium.

In the following, a description is given of an example in which the electrode reactant is lithium. A secondary battery that obtains a battery capacity by utilizing insertion and extraction of lithium is a so-called lithium-ion secondary battery. In the lithium-ion secondary battery, lithium is inserted and extracted in an ionic state.

Figure 1:
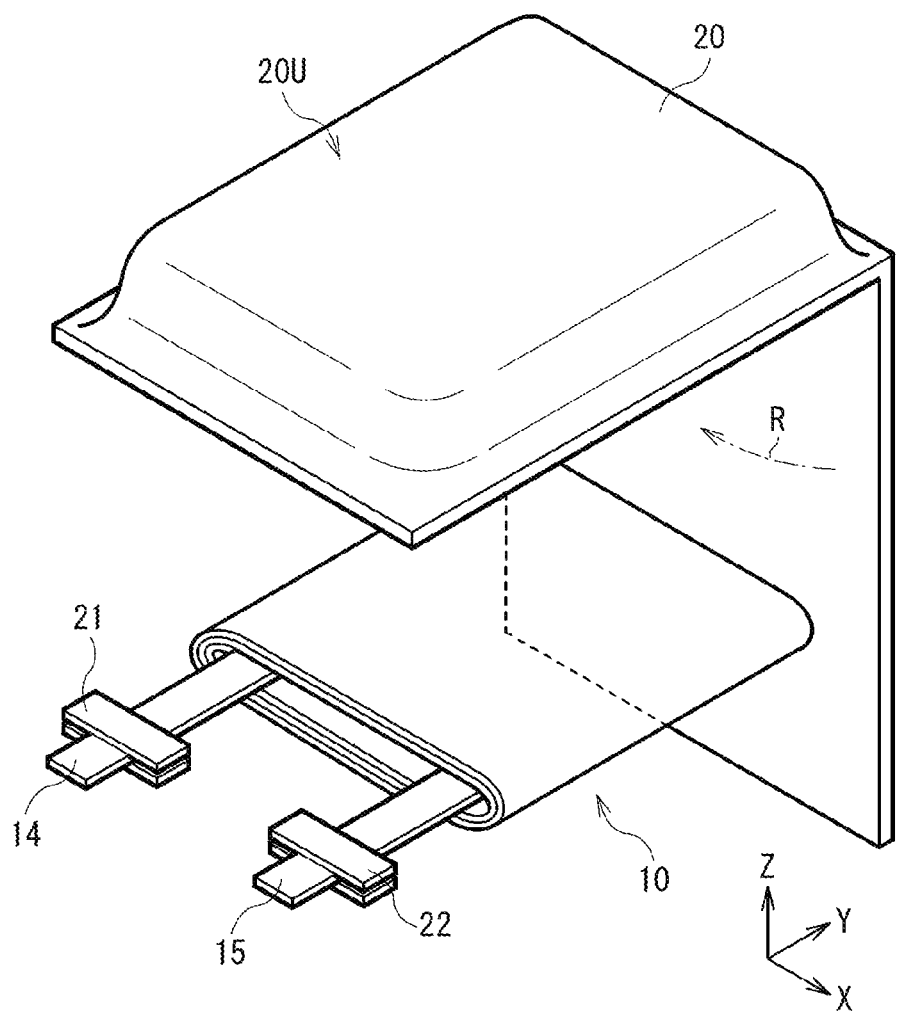
FIG. 1 is a perspective view of a configuration of a secondary battery according to an embodiment of the present technology.
Figure 2:
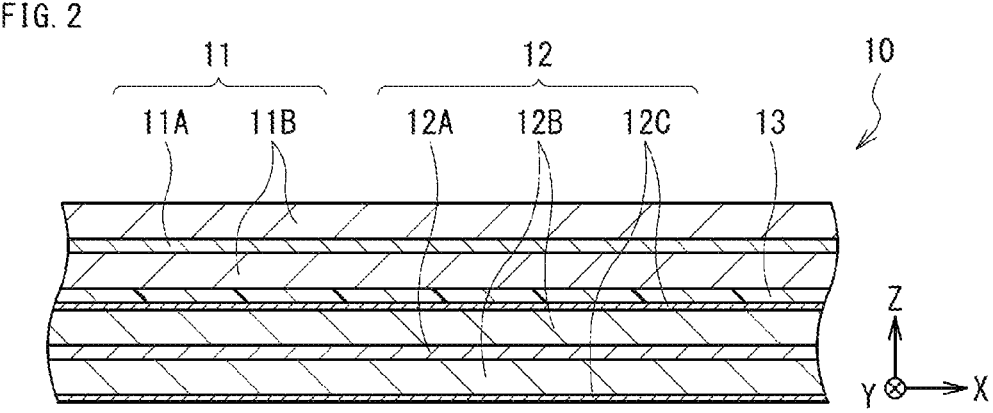
FIG. 2 is a sectional view of a configuration of a battery device illustrated in FIG. 1.

FIG. 1 illustrates a perspective configuration of the secondary battery, and FIG. 2 illustrates a sectional configuration of a battery device 10 illustrated in FIG. 1. Note that FIG. 1 illustrates a state in which the battery device 10 and an outer package film 20 are separated away from each other, and FIG. 2 illustrates only a portion of the battery device 10.

As illustrated in FIG. 1, the secondary battery includes the battery device 10, the outer package film 20, a positive electrode lead 14, and a negative electrode lead 15. The secondary battery described here is a secondary battery of a laminated-film type including an outer package member (the outer package film 20) having flexibility (or softness) as an outer package member for containing the battery device 10.

As illustrated in FIG. 1, the outer package film 20 is a single film-shaped member foldable in a direction of an arrow R (a dash-dot-dash line). Since the outer package film 20 contains the battery device 10 as described above, the outer package film 20 contains a positive electrode 11, a negative electrode 12, and an electrolytic solution that are to be described later. The outer package film 20 has a depression part 20U (a so-called deep drawn part) designed to place the battery device 10 therein.

Specifically, the outer package film 20 is a laminated film including three layers: a fusion-bonding layer, a metal layer, and a surface protective layer that are stacked in this order from the inner side. In a state where the outer package film 20 is folded, outer edges of the fusion-bonding layer opposed to each other are fusion-bonded to each other. The fusion-bonding layer includes a polymer compound such as polypropylene. The metal layer includes a metal material such as aluminum. The surface protective layer includes a polymer compound such as nylon.

Note that the configuration (the number of layers) of the outer package film 20 is not particularly limited. The outer package film 20 may thus include one layer, two layers, or four or more layers.

A sealing film 21 is interposed between the outer package film 20 and the positive electrode lead 14, and a sealing film 22 is interposed between the outer package film 20 and the negative electrode lead 15. Each of the sealing films 21 and 22 is a member for preventing outside air from entering inside the outer package film 20. The sealing films 21 and 22 each include one or more of polymer compounds including, without limitation, polyolefin, having adherence to corresponding one of the positive electrode lead 14 and the negative electrode lead 15. Examples of the polyolefin include polyethylene, polypropylene, modified polyethylene, and modified polypropylene. Note that the sealing film 21, the sealing film 22, or both may be omitted.

As illustrated in FIGS. 1 and 2, the battery device 10 is contained inside the outer package film 20 and includes the positive electrode 11, the negative electrode 12, a separator 13, and the electrolytic solution (not illustrated).

The battery device 10 is a structure (a wound electrode body) in which the positive electrode 11 and the negative electrode 12 are stacked on each other with the separator 13 interposed therebetween, and the stack of the positive electrode 11, the negative electrode 12, and the separator 13 is wound around a winding axis (an imaginary axis extending in a Y-axis direction). Thus, the positive electrode 11 and the negative electrode 12 are opposed to each other with the separator 13 interposed therebetween.

Here, the battery device 10 has an elongated three-dimensional shape. That is, a sectional face of the battery device 10 crossing the winding axis (a sectional face along an XZ plane) has an elongated shape defined by a major axis and a minor axis, and more specifically, an elongated, substantially oval shape. The major axis is an imaginary axis extending in an X-axis direction and having a relatively large length. The minor axis is an imaginary axis extending in a Z-axis direction crossing the X-axis direction and having a relatively small length.

As illustrated in FIG. 2, the positive electrode 11 includes a positive electrode current collector 11A having two opposed surfaces, and two positive electrode active material layers 11B provided on the two opposed surfaces of the positive electrode current collector 11A, respectively. However, the positive electrode active material layer 11B may be provided on only one of the two opposed surfaces of the positive electrode current collector 11A.

The positive electrode current collector 11A includes one or more of electrically conductive materials including, without limitation, a metal material. Examples of the metal material include aluminum, nickel, and stainless steel.

The positive electrode active material layer 11B includes one or more of positive electrode active materials into which lithium is insertable and from which lithium is extractable. The positive electrode active material layer 11B may further include a material such as a positive electrode binder or a positive electrode conductor.

The positive electrode active material is not limited to a particular kind. Specifically, the positive electrode active material is a lithium-containing compound such as a lithium transition metal compound. The lithium transition metal compound is a compound including, as constituent elements, lithium and one or more of transition metal elements, and may further include one or more of other elements. The other elements are not limited to particular kinds. Specifically, the other elements are those belonging to Groups 2 to 15 in the long period periodic table (however, a transition metal element is excluded). The lithium transition metal compound is not limited to a particular kind. Specifically, examples of the lithium transition metal compound include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a material such as a metal material or a polymer compound.

A method of forming the positive electrode active material layer 11B is not particularly limited. Specifically, the method of forming the positive electrode active material layer 11B includes one or more of methods including, without limitation, a coating method.

As illustrated in FIG. 2, the negative electrode 12 includes a negative electrode current collector 12A having two opposed surfaces, two negative electrode active material layers 12B provided on the two opposed surfaces of the negative electrode current collector 12A, respectively, and two films 12C provided on the two opposed surfaces of the negative electrode current collector 12A, respectively. However, the negative electrode active material layer 12B and the film 12C may be provided on only one of the two opposed surfaces of the negative electrode current collector 12A.

The negative electrode current collector 12A includes one or more of electrically conductive materials including, without limitation, a metal material. Examples of the metal material include copper, aluminum, nickel, and stainless steel.

The negative electrode active material layer 12B includes one or more of negative electrode active materials into which lithium is insertable and from which lithium is extractable. The negative electrode active material layer 12B may further include a material such as a negative electrode binder or a negative electrode conductor. Details of the negative electrode binder are similar to those of the positive electrode binder, and details of the negative electrode conductor are similar to those of the positive electrode conductor.

The negative electrode active material is not limited to a particular kind. Specifically, the negative electrode active material is a material such as a carbon material or a metal-based material. Examples of the carbon material include graphitizable carbon, non-graphitizable carbon, and graphite. Examples of the graphite include natural graphite and artificial graphite. The metal-based material is a material including, as a constituent element, one or more elements among metal elements and metalloid elements that are each able to form an alloy with lithium. Examples of the metal elements and metalloid elements include silicon and tin. Note that the metal-based material may be a simple substance, an alloy, a compound, a mixture of two or more thereof, or a material including two or more phases thereof.

Specific examples of the metal-based material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $LiSiO$, $SnO_w$ ($0<w\leq2$), $SnSiO_3$, $LiSnO$, and $Mg_2Sn$. Note that v in $SiO_v$ may satisfy $0.2<v<1.4$.

A method of forming the negative electrode active material layer 12B is not particularly limited. Specifically, the method of forming the negative electrode active material layer 12B includes one or more of methods including, without limitation, a coating method, a vapor-phase method, a liquid-phase method, a thermal spraying method, and a firing (sintering) method.

The film 12C is formed on the surface of the negative electrode active material layer 12B, and thus covers the surface of the negative electrode active material layer 12B. The film 12C may cover the entirety of the surface of the negative electrode active material layer 12B or may cover only a portion of the surface of the negative electrode active material layer 12B. In the latter case, a plurality of films 12C provided on respective locations separated from each other may cover the surface of the negative electrode active material layer 12B.

As will be described later, the film 12C is a film formed by charging and discharging the secondary battery for one or more cycles after the secondary battery is assembled. Thus, the negative electrode 12 of the secondary battery having been charged and discharged for one or more cycles after assembling of the secondary battery includes the negative electrode active material layer 12B on which the film 12C is formed.

In detail, the phrase "the negative electrode 12 including the negative electrode active material layer 12B on which the film 12C is formed" means that the secondary battery has been charged and discharged for one or more cycles after being assembled, i.e., the secondary battery has undergone a stabilization process to be described later after being assembled, as described above. The stabilization process is a charging and discharging process for forming the film 12C including the organic substance on the surface of the negative electrode active material layer 12B. Note that various conditions including, without limitation, an environment temperature, the number of times of charging and discharging (the number of cycles), charging conditions, and discharging conditions are not particularly limited and may be set to any values as long as the secondary battery has been charged and discharged for one or more cycles after being assembled.

The film 12C described here is mainly a deposited film including one or more of products including, without limitation, decomposition products and reaction products formed upon charging and discharging. The products including, without limitation, the decomposition products and the reaction products are substances formed through decomposition and reaction of one or more of carbon-containing components included in the electrolytic solution to be described later. The term "carbon-containing component" is a generic term for a component (compound) including carbon as a constituent element out of the components of the electrolytic solution. Accordingly, the film 12C includes the organic substance, that is, the film 12C includes carbon as a constituent element.

The film 12C may be formed by a reaction between the carbon-containing components, a reaction between the carbon-containing component and a carbon-free component, or both upon charging and discharging. The term "carbon-free component" is a generic term for a component (compound) including no carbon as a constituent element out of the components of the electrolytic solution.

To check whether the film 12C including the organic substance has been formed on the surface of the negative electrode active material layer 12B, the surface (the film 12C) of the negative electrode 12 is subjected to an elemental analysis using X-ray photoelectron spectroscopy (XPS). The elemental analysis is conducted in an analysis range from a surface of the film 12C to a depth of 20 nm in a depth direction (i.e., a thickness direction). Accordingly, it is preferable that the film 12C have a thickness greater than 20 nm, more specifically, a thickness of 20 nm to 80 nm. A reason for this is that such a film 12C will not hinder insertion and extraction of lithium upon charging and discharging and will electrochemically protect the surface of the negative electrode active material layer 12B.

In a case where carbon is detected as a result of the elemental analysis using XPS, it follows that the film 12C has been formed on the surface of the negative electrode active material layer 12B, that is, the secondary battery has been charged and discharged for one or more cycles after being assembled. In contrast, in a case where no carbon is detected as a result of the elemental analysis using XPS, it follows that the film 12C has not been formed on the surface of the negative electrode active material layer 12B, that is, the secondary battery has not been charged and discharged yet after being assembled.

In a case where a commercially available secondary battery is used to check for whether the film 12C has been formed therein, it is assumed that the film 12C has been already formed. A reason for this is that a commercially available secondary battery has generally undergone the charging and discharging process for one or more cycles to form the film 12C therein in advance in a stage (manufacturing stage) prior to shipping to market so that the secondary battery will stably work from the beginning of use by a user.

As illustrated in FIG. 2, the separator 13 is an insulating porous film interposed between the positive electrode 11 and the negative electrode 12. The separator 13 allows lithium ions to pass therethrough while preventing contact between the positive electrode 11 and the negative electrode 12. The separator 13 includes one or more of polymer compounds including, without limitation, polytetrafluoroethylene, polypropylene, and polyethylene.

The electrolytic solution includes a solvent, an electrolyte salt, and an additive. The positive electrode 11, the negative electrode 12, and the separator 13 are each impregnated with the electrolytic solution.

The solvent includes one or more of non-aqueous solvents (organic solvents). An electrolytic solution including the non-aqueous solvent is a so-called non-aqueous electrolytic solution. Examples of the non-aqueous solvent include esters and ethers. More specific examples of the non-aqueous solvent include a carbonic-acid-ester-based compound, a carboxylic-acid-ester-based compound, and a lactone-based compound.

Examples of the carbonic-acid-ester-based compound include a cyclic carbonic acid ester and a chain carbonic acid ester. Specific examples of the cyclic carbonic acid ester include ethylene carbonate and propylene carbonate. Specific examples of the chain carbonic acid ester include dimethyl carbonate, diethyl carbonate, and methyl ethyl carbonate. Examples of the carboxylic-acid-ester-based compound include a chain carboxylic acid ester. Specific examples of the chain carboxylic acid ester include methyl acetate, ethyl acetate, methyl propionate, ethyl propionate, propyl propionate, and ethyl trimethylacetate. Examples of the lactone-based compound include lactone. Specific examples of the lactone include γ-butyrolactone and γ-valerolactone. Note that examples of the ethers may include 1,2-dimethoxy ethane, tetrahydrofuran, 1,3-dioxolane, and 1,4-dioxane as well as the lactone-based compound described above.

Examples of the non-aqueous solvent include a halogenated carbonic acid ester, a phosphoric acid ester, an acid anhydride, a mononitrile compound, and an isocyanate compound. A reason for this is that chemical stability of the electrolytic solution improves. However, a fluorinated cyclic carbonic acid ester to be described later is excluded from the halogenated carbonic acid ester described here, and a sulfur-containing cyclic compound to be described later is excluded from the acid anhydride described here.

Examples of the halogenated carbonic acid ester include a fluorinated chain carbonic acid ester. Specific examples of the fluorinated chain carbonic acid ester include fluoromethylmethyl carbonate, bis(fluoromethyl) carbonate, and difluoromethylmethyl carbonate. Specific examples of the phosphoric acid ester include trimethyl phosphate and triethyl phosphate. Examples of the acid anhydride include a cyclic dicarboxylic acid anhydride. Specific examples of the cyclic dicarboxylic acid anhydride include succinic anhydride, glutaric anhydride, and maleic anhydride. Specific examples of the mononitrile compound include acetonitrile and acrylonitrile. Specific examples of the isocyanate compound include hexamethylene diisocyanate.

In particular, it is preferable that the solvent include the chain carboxylic acid ester. A reason for this is that such a solvent makes it easier to form the film 12C stably by utilizing charging and discharging reactions. A content of the chain carboxylic acid ester in the solvent is not particularly limited. In particular, it is preferable that the content of the chain carboxylic acid ester in the solvent be within a range from 10 wt % to 50 wt % both inclusive. A reason for this is that such a solvent makes it easier to form the film 12C sufficiently stably.

The electrolyte salt is one or more of light metal salts including, without limitation, a lithium salt. However, an oxalic acid metal salt to be described later is excluded from the electrolyte salt (lithium salt) described here.

Specific examples of the lithium salt include lithium hexafluorophosphate ($LiPF_6$), lithium tetrafluoroborate ($LiBF_4$), lithium trifluoromethanesulfonate ($LiCF_3SO_3$), lithium bis(fluorosulfonyl)imide ($LiN(FSO_2)_2$), lithium bis(trifluoromethane sulfonyl)imide ($LiN(CF_3SO_2)_2$), and lithium tris(trifluoromethanesulfonyl) methide ($LiC(CF_3SO_2)_3$).

Although not particularly limited, a content of the electrolyte salt is within a range from 0.3 mol/kg to 3.0 mol/kg both inclusive with respect to the solvent. A reason for this is that high ionic conductivity is obtainable.

The additive includes four compounds (a sulfur-containing cyclic compound, a fluorinated cyclic carbonic acid ester, an unsaturated cyclic carbonic acid ester, and a multi-nitrile chain compound) to be involved in the formation of the film 12C.

The term "sulfur-containing cyclic compound" is a generic term for a cyclic compound including one or more sulfur atoms as a constituent element, as described above. In the sulfur-containing cyclic compound, one or more side chains may be bonded to its ring. Only one kind of the sulfur-containing cyclic compound may be included or two or more kinds of the sulfur-containing cyclic compounds may be included.

Note that the sulfur-containing cyclic compound includes the one or more sulfur atoms as a constituent element of the ring. Thus, a compound whose side chain includes sulfur as a constituent element but whose ring includes no sulfur as a constituent element is excluded from the sulfur-containing cyclic compound described here. Note that the side chain may include sulfur as a constituent element or may include no sulfur as a constituent element as long as the ring includes sulfur as a constituent element.

The sulfur-containing cyclic compound is not limited to a particular kind. Specifically, examples of the sulfur-containing cyclic compound include a cyclic sulfonic acid ester, a cyclic disulfonic acid anhydride, and a cyclic carboxylic acid sulfonic acid anhydride. Specific examples of the cyclic sulfonic acid ester include propane sultone (1,3-propane sultone) and propene sultone (1-propene 1,3-sultone). Specific examples of the cyclic disulfonic acid anhydride include a cyclic ethane disulfonic acid anhydride and a cyclic propane disulfonic acid anhydride. Specific examples of the cyclic carboxylic acid sulfonic acid anhydride include a sulfobenzoic anhydride, a sulfopropionic anhydride, and a sulfobutyric anhydride.

The term "fluorinated cyclic carbonic acid ester" is a generic term for a cyclic carbonic acid ester including one or more fluorine atoms as a constituent elements, as described above. That is, the fluorinated cyclic carbonic acid ester is a cyclic carbonic acid ester in which one or more hydrogen groups are substituted by fluorine groups. Note that only one kind of the fluorinated cyclic carbonic acid ester may be included or two or more kinds of the fluorinated cyclic carbonic acid esters may be included.

Specific examples of the fluorinated cyclic carbonic acid ester include monofluoroethylene carbonate (4-fluoro-1,3-dioxolane-2-one) and difluoroethylene carbonate (4,5-fluoro-1,3-dioxolane-2-one).

The term "unsaturated cyclic carbonic acid ester" is a generic term for a cyclic carbonic acid ester including one or more unsaturated bonds (carbon-carbon double bonds), as described above. The carbon-carbon double bond may be included in the ring or may be included in one or more side chains bonded to the ring. Only one kind of the unsaturated cyclic carbonic acid ester may be included or two or more kinds of the unsaturated cyclic carbonic acid esters may be included.

Specific examples of the unsaturated cyclic carbonic acid ester include vinylene carbonate (1,3-dioxol-2-one), vinyl ethylene carbonate (4-vinyl-1,3-dioxolane-2-one), and methylene ethylene carbonate (4-methylene-1,3-dioxolane-2-one).

The term "multi-nitrile chain compound" is a generic term for a chain compound including two or more cyano groups, as described above. The multi-nitrile chain compound may include two cyano groups or may include three or more cyano groups. Only one kind of the multi-nitrile chain compound may be included or two or more kinds of the multi-nitrile chain compounds may be included.

The multi-nitrile chain compound is not limited to a particular kind. Specifically, examples of the multi-nitrile chain compound include a dinitrile chain compound including two cyano groups and a trinitrile chain compound including three cyano groups. Specific examples of the dinitrile chain compound include malononitrile, succinonitrile, glutaronitrile, adiponitrile, and sebaconitrile. Specific examples of the trinitrile chain compound include 1,3,6-hexanetricarbonitrile.

Here, a reason why the electrolytic solution includes the four compounds (the sulfur-containing cyclic compound, the fluorinated cyclic carbonic acid ester, the unsaturated cyclic carbonic acid ester, and the multi-nitrile chain compound) as the additive is that the secondary battery is prevented from easily increasing in electric resistance as three physical property conditions to be described later are satisfied. A reason why the secondary battery is prevented from easily increasing in electric resistance will be described in detail later.

A content of the sulfur-containing cyclic compound in the electrolytic solution is not particularly limited. In particular, it is preferable that the content of the sulfur-containing cyclic compound in the electrolytic solution be within a range from 0.5 wt % to 1.2 wt % both inclusive. A content of the fluorinated cyclic carbonic acid ester in the electrolytic solution is not particularly limited. In particular, it is preferable that the content of the fluorinated cyclic carbonic acid ester in the electrolytic solution be within a range from 1.2 wt % to 4.0 wt % both inclusive. A content of the unsaturated cyclic carbonic acid ester in the electrolytic solution is not particularly limited. In particular, it is preferable that the content of the unsaturated cyclic carbonic acid ester in the electrolytic solution be within a range from 0.1 wt % to 0.5 wt % both inclusive. A content of the multi-nitrile chain compound in the electrolytic solution is not particularly limited. In particular, it is preferable that the content of the multi-nitrile chain compound in the electrolytic solution be within a range from 3.0 wt % to 7.0 wt % both inclusive. A reason for this is that the secondary battery is sufficiently prevented from easily increasing in electric resistance.

In a case where the additive includes two or more of the sulfur-containing cyclic compounds, the content of the sulfur-containing cyclic compound described above corresponds to a total sum of the contents of the two or more of the sulfur-containing cyclic compounds. The same similarly applies to the content of the fluorinated cyclic carbonic acid ester, the content of the unsaturated cyclic carbonic acid ester, and the content of the multi-nitrile chain compound.

The content of the sulfur-containing cyclic compound is measured by collecting the electrolytic solution from the secondary battery having been completed and then conducting a mass analysis on the electrolytic solution using gas chromatography-mass spectrometry (GC/MS), as will be described later. The same similarly applies to the content of the fluorinated cyclic carbonic acid ester, the content of the unsaturated cyclic carbonic acid ester, and the content of the multi-nitrile chain compound.

The additive may further include two or more of the cyclic ether compounds. A reason for this is that the secondary battery is further prevented from easily increasing in electric resistance. The term "cyclic ether compound" is a generic term for a cyclic compound including oxygen as a constituent element. In the cyclic ether compound, one or more side chains may be bonded to its ring. Note that the cyclic ether compound includes one or more oxygen atoms as a constituent element of the ring. Thus, a compound whose side chain includes oxygen as a constituent element but whose ring includes no oxygen as a constituent element is excluded from the cyclic ether compound described here.

Specific examples of the cyclic ether compound include tetrahydrofuran, 2-methyltetrahydrofuran, 1,3-dioxolane, 4-methyl-1,3-dioxolane, tetrahydropyran, 1,3-dioxane, and 1,4-dioxane.

A content of the cyclic ether compound in the electrolytic solution is not particularly limited. In particular, it is preferable that the content of the cyclic ether compound in the electrolytic solution be within a range from 0.5 wt % to 1.0 wt % both inclusive. As reason for this is that the secondary battery is sufficiently prevented from easily increasing in electric resistance.

The additive may further include one or more of oxalic acid metal salts. A reason for this is that the secondary battery is further prevented from easily increasing in electric resistance. The term "oxalic acid metal salt" is a generic term for a metal salt including one or more oxalic acid groups (—O—C(=O)—C(=O)—O—). The oxalic acid metal salt includes a positive ion (a cation) including a metal ion, and a negative ion (an anion) including one or more oxalic acid groups.

The metal ion, which is a cation, is not limited to a particular kind. Specifically, examples of the metal ion include light metal ions including an alkali metal ion, an alkaline earth metal ion, and an aluminum ion. Specific examples of the alkali metal ion include a lithium ion, a sodium ion, and a potassium ion. Specific examples of the alkaline earth metal ion include a beryllium ion, a magnesium ion, and a calcium ion.

The anion includes a central atom to which one or more oxalic acid groups are bonded. The central atom is not limited to a particular kind. Examples of the central atom include a boron (B) atom, a phosphorus (P) atom, and an aluminum (Al) atom.

Specific examples of the oxalic acid metal salt include lithium difluoro (oxalate) borate, lithium bis(oxalate) borate, and lithium difluorobis(oxalate) phosphate.

A content of the oxalic acid metal salt in the electrolytic solution is not particularly limited. In particular, it is preferable that the content of the oxalic acid metal salt in the electrolytic solution be within a range from 0.1 wt % to 0.2 wt % both inclusive. A reason for this is that the secondary battery is sufficiently prevented from easily increasing in electric resistance.

The positive electrode lead 14 is coupled to the positive electrode 11 (the positive electrode current collector 11A), and includes one or more of electrically conductive materials including, without limitation, aluminum. The negative electrode lead 15 is coupled to the negative electrode 12 (the negative electrode current collector 12A), and includes one or more of electrically conductive materials including, without limitation, copper, nickel, and stainless steel. The positive electrode lead 14 and the negative electrode lead 15 each have a shape such as a thin plate shape or a meshed shape.

Here, as illustrated in FIG. 1, the positive electrode lead 14 and the negative electrode lead 15 are each led out from inside the outer package film 20 to the outside in a common direction. However, the positive electrode lead 14 and the negative electrode lead 15 may be led out in different directions.

Here, the number of the positive electrode leads 14 is one. However, the number of the positive electrode leads 14 is not particularly limited and may be two or greater. In particular, in a case where the number of the positive electrode leads 14 is two or greater, the electric resistance of the secondary battery decreases. The description of the number of the positive electrode leads 14 given here similarly applies to the number of the negative electrode leads 15. Thus, the number of the negative electrode leads 15 is not limited to one and may be two or greater.

As described above, the electrolytic solution in the secondary battery includes the four compounds (the sulfur-containing cyclic compound, the fluorinated cyclic carbonic acid ester, the unsaturated cyclic carbonic acid ester, and the multi-nitrile chain compound) as the additive. In this case, three physical property conditions described below are satisfied together to prevent the secondary battery from easily increasing in electric resistance.

[First Physical Property Condition]

The content of the sulfur-containing cyclic compound, the content of the fluorinated cyclic carbonic acid ester, the content of the unsaturated cyclic carbonic acid ester, and the content of the multi-nitrile chain compound in the electrolytic solution are each measured by conducting the mass analysis on the electrolytic solution using GC/MS.

In this case, the content of the sulfur-containing cyclic compound, the content of the fluorinated cyclic carbonic acid ester, the content of the unsaturated cyclic carbonic acid ester, and the content of the multi-nitrile chain compound each satisfy the following relation (magnitude relation): the content of the multi-nitrile chain compound>the content of the fluorinated cyclic carbonic acid ester>the content of the sulfur-containing cyclic compound>the content of the unsaturated cyclic carbonic acid ester.

That is, the content of the multi-nitrile chain compound is higher than the content of the fluorinated cyclic carbonic acid ester. In addition, the content of the fluorinated cyclic carbonic acid ester is higher than the content of the sulfur-containing cyclic compound. Moreover, the content of the sulfur-containing cyclic compound is higher than the content of the unsaturated cyclic carbonic acid ester.

[Second Physical Property Condition]

In a case where the content of the sulfur-containing cyclic compound, the content of the fluorinated cyclic carbonic acid ester, the content of the unsaturated cyclic carbonic acid ester, and the content of the multi-nitrile chain compound are each measured using GC/MS as described above, a total sum of the content of the sulfur-containing cyclic compound, the content of the fluorinated cyclic carbonic acid ester, the content of the unsaturated cyclic carbonic acid ester, and the content of the multi-nitrile chain compound is within a range from 5.0 wt % to 11.0 wt % both inclusive.

[Third Physical Property Condition]

In a case where the elemental analysis is conducted on the surface (the film 12C) of the negative electrode 12 using XPS to thereby specify an element concentration of carbon (at %), the element concentration of carbon is within a range from 80 at % to 94 at % both inclusive. Note that the elemental analysis using XPS is conducted in the analysis range from the surface of the film 12C to the depth of 20 nm in the depth direction, as described above.

Upon charging the secondary battery, lithium is extracted from the positive electrode 11, and the extracted lithium is inserted into the negative electrode 12 via the electrolytic solution. Upon discharging the secondary battery, lithium is extracted from the negative electrode 12, and the extracted lithium is inserted into the positive electrode 11 via the electrolytic solution. Upon charging and discharging the secondary battery, lithium is inserted and extracted in an ionic state.

In a case of manufacturing the secondary battery, the positive electrode 11 and the negative electrode 12 are fabricated, and the electrolytic solution is prepared, following which the secondary battery is fabricated using the positive electrode 11, the negative electrode 12, and the electrolytic solution, according to a procedure described below.

First, a positive electrode mixture that is a mixture of the positive electrode active material and a material such as the positive electrode binder is put into a solvent such as an organic solvent to thereby prepare a positive electrode mixture slurry in a paste form. Thereafter, the positive electrode mixture slurry is applied on each of the two opposed surfaces of the positive electrode current collector 11A to thereby form the positive electrode active material layer 11B. Thereafter, the positive electrode active material layer 11B may be compression-molded using a machine such as a roll pressing machine. In this case, the positive electrode active material layer 11B may be heated or may be compression-molded multiple times. The positive electrode active material layer 11B is thus formed on each of the two opposed surfaces of the positive electrode current collector 11A. As a result, the positive electrode 11 is fabricated.

First, a negative electrode mixture that is a mixture of the negative electrode active material and a material such as the negative electrode binder is put into a solvent such as an organic solvent to thereby prepare a negative electrode mixture slurry in a paste form. Thereafter, the negative electrode mixture slurry is applied on each of the two opposed surfaces of the negative electrode current collector 12A to thereby form the negative electrode active material layer 12B. Thereafter, the negative electrode active material layer 12B may be compression-molded using a machine such as a roll pressing machine, as in the fabrication procedure for the positive electrode 11 described above. Thereafter, the secondary battery is assembled, following which the stabilization process (the charging and discharging process) is performed on the secondary battery, as will be described later. The film 12C including the organic substance is thereby formed on the surface of the negative electrode active material layer 12B. The negative electrode active material layer 12B and the film 12C are thus formed on each of the two opposed surfaces of the negative electrode current collector 12A. As a result, the negative electrode 12 is fabricated.

The electrolyte salt is put into the solvent, following which the additive (the sulfur-containing cyclic compound, the fluorinated cyclic carbonic acid ester, the unsaturated cyclic carbonic acid ester, and the multi-nitrile chain compound) is added to the solvent. The electrolyte salt and the additive are thereby each dispersed or dissolved in the solvent. As a result, the electrolytic solution is prepared. Note that, in a case of preparing the electrolytic solution, still another additive (a cyclic ether compound, an oxalic acid metal salt, or both) may be added to the solvent.

First, the positive electrode lead 14 is coupled to the positive electrode 11 (the positive electrode current collector 11A) by a method such as a welding method, and the negative electrode lead 15 is coupled to the negative electrode 12 (the negative electrode current collector 12A) by a method such as a welding method.

Thereafter, the positive electrode 11 and the negative electrode 12 are stacked on each other with the separator 13 interposed therebetween, following which the stack of the positive electrode 11, the negative electrode 12, and the separator 13 is wound to thereby fabricate a wound body. The wound body has a configuration similar to the configuration of the battery device 10 except that the positive electrode 11, the negative electrode 12, and the separator 13 are not each impregnated with the electrolytic solution. Thereafter, the wound body is molded into an elongated shape by pressing the wound body with a machine such as a pressing machine.

Thereafter, the wound body is placed into the depression part 20U, following which the outer package film 20 is folded such that two sides of the outer package film 20 are opposed to each other. Thereafter, the outer edges of the two sides of the outer package film 20 (the fusion-bonding layer) opposed to each other are fusion-bonded with each other. The wound body is thereby contained in the outer package film 20 having a pouch shape.

Lastly, the electrolytic solution is injected into the outer package film 20 having the pouch shape, following which the outer edges of the remaining one side of the outer package film 20 (the fusion-bonding layer) are bonded to each other using a method such as a thermal-fusion-bonding method. In this case, the sealing film 21 is interposed between the outer package film 20 and the positive electrode lead 14, and the sealing film 22 is interposed between the outer package film 20 and the negative electrode lead 15. The wound body is thereby impregnated with the electrolytic solution. Thus, the battery device 10 is fabricated. Accordingly, the battery device 10 is sealed in the outer package film 20 having the pouch shape. As a result, the secondary battery is assembled.

The secondary battery is charged and discharged after being assembled. Various conditions, including, without limitation, an environment temperature, the number of times of charging and discharging (the number of cycles), charging conditions, and discharging conditions may be set to any values. The film 12C including the organic substance is thereby formed on the surface of the negative electrode active material layer 12B as described above, which electrochemically stabilizes a state of the secondary battery. As a result, the secondary battery including the outer package film 20, i.e., the secondary battery of the laminated-film type is completed.

According to the secondary battery, the electrolytic solution includes the additive (the sulfur-containing cyclic compound, the fluorinated cyclic carbonic acid ester, the unsaturated cyclic carbonic acid ester, and the multi-nitrile chain compound), and the film 12C including the organic substance is formed on the surface of the negative electrode active material layer 12B in the negative electrode 12. Further, the above-described three physical property conditions are satisfied together regarding the mass analysis of the electrolytic solution using GC/MS and the elemental analysis of the film 12C using XPS. Accordingly, it is possible to obtain a superior electric resistance characteristic for the following reasons.

In a case where the solvent of the electrolytic solution includes, for example, the carbonic-acid-ester-based compound, a superior cyclability characteristic is obtainable as dissociation of the electrolyte salt and mobility of ions are improved, whereas electric resistance is increased as the decomposition reaction of the solvent progresses due to repeated charging and discharging. A reason for this is that, as the film formed on the surface of the component such as the negative electrode 12 has high electric resistance, the electric resistance of the component such as the negative electrode 12 is increased due to the presence of the film being continuously formed as the decomposition reaction progresses.

A possible measure to suppress an increase in electric resistance caused by the decomposition reaction of the solvent is to increase the amount of the electrolytic solution. However, simply increasing the amount of the electrolytic solution results in an excessive amount of electrolytic solution in the secondary battery, which impairs the appearance of the secondary battery and decreases the energy density.

Instead of increasing the amount of the electrolytic solution, another measure is conceivable to add an additive having a property of being preferentially decomposable relative to the solvent to the electrolytic solution. Such an additive is consumed in the stabilization process (the charging and discharging process) of the secondary battery to form the film including the organic substance on the surface of the negative electrode 12, and still remains in the electrolytic solution after the stabilization process. When charging and discharging is repeated, the remaining additive is consumed to continuously form the film on the surface of the negative electrode 12. Accordingly, the decomposition reaction of the solvent is suppressed even when charging and discharging is repeated. This prevents the electric resistance from easily increasing.

In this case, in particular, a combined use of two or more of additives different from each other makes it easier to continuously suppress the decomposition reaction of the solvent. A reason for this is that, as the decomposability (ease of decomposing) of the additive differs depending on the kind of the additive, the combined use of the two or more of additives having different decomposability makes it possible to stagger the times to be taken from the starts to the completions of the decomposition reactions of these additives relative to each other. This delays the time when all the additives will be completely decomposed, i.e., the time when the additives will be depleted due to the decomposition reactions, and in turn, delays the time when the solvent will start decomposing. As a result, the time when the electric resistance of the secondary battery will start increasing is delayed. Accordingly, an advantage is obtained in that it is possible to suppress an increase in the electric resistance.

However, simply using the two or more of additives in combination is not enough to obtain the advantage described above. Actually, it is necessary to properly recognize the decomposability (e.g., decomposition speed) of each additive and appropriately adjust the contents of the additives (the content of each of the additives and the total sum of the contents of the additives) in accordance with the combination of the two or more of additives. A reason for this is that, if the content of each of the additives and the total sum of the contents of the additives are not appropriately adjusted in the combined use of the two or more of additives, it is not possible to appropriately stagger the times to be taken from the starts to the completions of the decomposition reactions of these additives relative to each other. Moreover, in some cases, the decomposition reactions of these additives will complete almost at the same time. In particular, if the decomposition reactions of all of the additives complete in an early stage of repeated charging and discharging, the solvent starts decomposing in the early stage of the charging and discharging. This eliminates the importance of the combined use of the two or more of additives.

In view of these technical backgrounds, the secondary battery according to the present embodiment includes the electrolytic solution including the four compounds (the sulfur-containing cyclic compound, the fluorinated cyclic carbonic acid ester, the unsaturated cyclic carbonic acid ester, and the multi-nitrile chain compound) as the additive as described above. Accordingly, the three physical property conditions regarding the results of the analyses (GS/MS and XPS) are satisfied together. Thus, the film 12C including the organic substance is formed on the surface of the negative electrode active material layer 12B.

In this case, the four compounds having different decomposability are used as the additive, and the content of each of the compounds (the magnitude relation among the contents of these additives) and the total sum of the contents of the additives are appropriately adjusted. Accordingly, the times when the decomposition reactions of the compounds will start or complete are appropriately staggered relative to each other, which sufficiently delays the time when the solvent will start decomposing. That is, the time when the electric resistance of the solvent will start increasing due to the decomposition reaction of the solvent is sufficiently delayed. This efficiently suppresses an increase in the electric resistance, preventing the electric resistance from easily increasing. Accordingly, it is possible to obtain a superior electric resistance characteristic.

In particular, the content of the sulfur-containing cyclic compound may be within the range from 0.5 wt % to 1.2 wt % both inclusive, the content of the fluorinated cyclic carbonic acid ester may be within the range from 1.2 wt % to 4.0 wt % both inclusive, the content of the unsaturated cyclic carbonic acid ester may be within the range from 0.1 wt % to 0.5 wt % both inclusive, and the content of the multi-nitrile chain compound may be within the range from 3.0 wt % to 7.0 wt % both inclusive. This makes it easier to satisfy the above-described three physical property conditions together, sufficiently preventing the secondary battery from easily increasing in electric resistance. Accordingly, it is possible to obtain a higher effect.

Further, the electrolytic solution may further include the cyclic ether compound as the additive, and the content of the cyclic ether compound in the electrolytic solution may be within the range from 0.5 wt % to 1.0 wt % both inclusive. This further prevents the secondary battery from easily increasing in electric resistance. Accordingly, it is possible to obtain a higher effect.

Further, the electrolytic solution may further include the oxalic acid metal salt as the additive, and the content of the oxalic acid metal salt in the electrolytic solution may be within the range from 0.1 wt % to 0.2 wt % both inclusive. This further prevents the secondary battery from easily increasing in electric resistance. Accordingly, it is possible to obtain a higher effect.

Further, the solvent of the electrolytic solution may include the chain carboxylic acid ester, and the content of the chain carboxylic acid ester in the solvent may be within the range from 10 wt % to 50 wt % both inclusive. This makes it easier to form the film 12C sufficiently stably. Accordingly, it is possible to obtain a higher effect.

Further, the secondary battery may be a lithium-ion secondary battery. This makes it possible to stably obtain a sufficient battery capacity by utilizing insertion and extraction of lithium. Accordingly, it is possible to obtain a higher effect.

Next, a description is given of modifications of the secondary battery. As described below, the configuration of the secondary battery described above is modifiable as appropriate. Note that a series of modifications described below may be combined with each other.

The separator 13 that is a porous film is used. However, although not specifically illustrated here, a separator of a stacked type including a polymer compound layer may be used instead of the separator 13 that is a porous film.

Specifically, the separator of the stacked type includes a porous film having two opposed surfaces, and a polymer compound layer provided on one of or each of the two opposed surfaces of the porous film. A reason for this is that the battery device 10 is prevented from easily occurring a positional displacement as adherence of the separator to each of the positive electrode 11 and the negative electrode 12 is improved. This prevents the secondary battery from easily swelling even when the decomposition reaction of the electrolytic solution occurs, for example. The polymer compound layer includes a polymer compound such as polyvinylidene difluoride which has a high physical strength and is electrochemically stable.

The porous film, the polymer compound layer, or both may include one or more of a plurality of kinds of insulating particles. A reason for this is that the insulating particles dissipate heat when the secondary battery generates heat, thereby improving safety (thermal resistance) of the secondary battery. Examples of the insulating particles include inorganic particles and resin particles. Specific examples of the inorganic particles include particles of aluminum oxide, aluminum nitride, boehmite, silicon oxide, titanium oxide, magnesium oxide, and zirconium oxide. Specific examples of the resin particles include particles of acrylic resin and styrene resin.

In a case of fabricating the separator of the stacked type, a precursor solution that includes materials including, without limitation, a polymer compound and an organic solvent is prepared, following which the precursor solution is applied on one of or each of the two opposed surfaces of the porous film. In this case, the insulating particles may be added to the precursor solution on an as-needed basis.

Also in the case where the separator of the stacked type is used, similar effects are obtainable as lithium ions are movable between the positive electrode 11 and the negative electrode 12.

The electrolytic solution that is a liquid electrolyte is used. However, although not specifically illustrate here, an electrolyte layer that is an electrolyte in a gel form may be used instead of the electrolytic solution.

In the battery device 10 including the electrolyte layer, the positive electrode 11 and the negative electrode 12 are stacked on each other with the separator 13 and the electrolyte layer interposed therebetween, and the stack of the positive electrode 11, the negative electrode 12, the separator 13, and the electrolyte layer is wound. The electrolyte layer is interposed between the positive electrode 11 and the separator 13, and between the negative electrode 12 and the separator 13.

Specifically, the electrolyte layer includes the electrolytic solution and a polymer compound. In the electrolyte layer, the electrolytic solution is held by the polymer compound. A reason for this is that liquid leakage is prevented. The configuration of the electrolytic solution is as described above. The polymer compound includes, for example, polyvinylidene difluoride. In a case of forming the electrolyte layer, a precursor solution that includes materials including, without limitation, the electrolytic solution, the polymer compound, and an organic solvent is prepared, following which the precursor solution is applied on one side or both sides of the positive electrode 11 and one side or both sides of the negative electrode 12.

Also in the case where the electrolyte layer is used, similar effects are obtainable as lithium ions are movable between the positive electrode 11 and the negative electrode 12 via the electrolyte layer.

Next, a description is given of applications (application examples) of the above-described secondary battery.

The applications of the secondary battery are not particularly limited as long as they are, for example, machines, equipment, instruments, apparatuses, or systems (an assembly of a plurality of pieces of equipment, for example) in which the secondary battery is usable mainly as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic equipment including portable electronic equipment; portable life appliances; apparatuses for data storage; electric power tools; battery packs to be mounted as detachable power sources on, for example, laptop personal computers; medical electronic equipment; electric vehicles; and electric power storage systems. Examples of the electronic equipment include video cameras, digital still cameras, mobile phones, laptop personal computers, cordless phones, headphone stereos, portable radios, portable televisions, and portable information terminals. Examples of the portable life appliances include electric shavers. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems for accumulation of electric power for a situation such as emergency. Note that the secondary battery may have a battery structure of the above-described laminated-film type, a cylindrical type, or any other type. Further, multiple secondary batteries may be used, for example, as a battery pack or a battery module.

In particular, the battery pack and the battery module are each effectively applied to relatively large-sized equipment, etc., including an electric vehicle, an electric power storage system, and an electric power tool. The battery pack, as will be described later, may include a single battery, or may include an assembled battery. The electric vehicle is a vehicle that operates (travels) using the secondary battery as a driving power source, and may be an automobile that is additionally provided with a driving source other than the secondary battery as described above, such as a hybrid automobile. The electric power storage system is a system that uses the secondary battery as an electric power storage source. An electric power storage system for home use accumulates electric power in the secondary battery which is an electric power storage source, and the accumulated electric power may thus be utilized for using, for example, home appliances.

An application example of the secondary battery will now be described in detail. The configuration of the application example described below is merely an example, and is appropriately modifiable.

Figure 3:
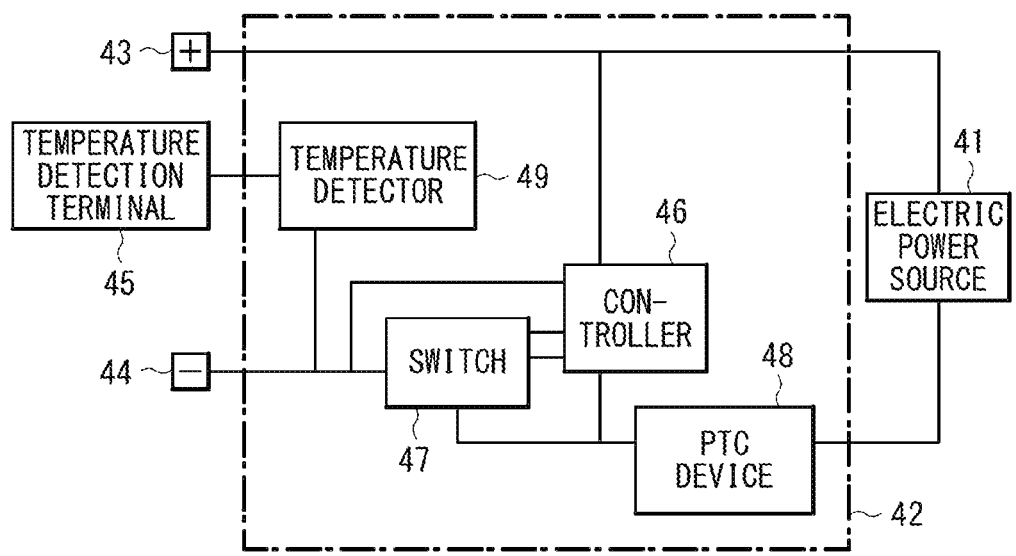
FIG. 3 is a block diagram illustrating a configuration of an application example of the secondary battery.

FIG. 3 illustrates a block configuration of a battery pack. The battery pack described here is a simple battery pack (a so-called soft pack) including one secondary battery, and is to be mounted on, for example, electronic equipment typified by a smartphone.

As illustrated in FIG. 3, the battery pack includes an electric power source 41 and a circuit board 42. The circuit board 42 is coupled to the electric power source 41, and includes a positive electrode terminal 43, a negative electrode terminal 44, and a temperature detection terminal 45. The temperature detection terminal 45 described here is a so-called T terminal.

The electric power source 41 includes one secondary battery. The secondary battery has a positive electrode lead coupled to the positive electrode terminal 43 and a negative electrode lead coupled to the negative electrode terminal 44. The electric power source 41 is couplable to outside via the positive electrode terminal 43 and the negative electrode terminal 44, and is thus chargeable and dischargeable via the positive electrode terminal 43 and the negative electrode terminal 44. The circuit board 42 includes a controller 46, a switch 47, a thermosensitive resistive device (a positive temperature coefficient (PTC) device) 48, and a temperature detector 49. However, the PTC device 48 may be omitted.

The controller 46 includes, for example, a central processing unit (CPU) and a memory, and controls an overall operation of the battery pack. The controller 46 detects and controls a use state of the electric power source 41 on an as-needed basis.

If a battery voltage of the electric power source 41 (the secondary battery) reaches an overcharge detection voltage or an overdischarge detection voltage, the controller 46 turns off the switch 47. This prevents a charging current from flowing into a current path of the electric power source 41. In addition, if a large current flows upon charging or discharging, the controller 46 turns off the switch 47 to block the charging current. The overcharge detection voltage and the overdischarge detection voltage are not particularly limited. For example, the overcharge detection voltage is 4.2 V±0.05 V and the overdischarge detection voltage is 2.4 V±0.1 V.

The switch 47 includes, for example, a charge control switch, a discharge control switch, a charging diode, and a discharging diode. The switch 47 performs switching between coupling and decoupling between the electric power source 41 and external equipment in accordance with an instruction from the controller 46. The switch 47 includes, for example, a metal-oxide-semiconductor field-effect transistor (MOSFET) including a metal-oxide semiconductor. The charging and discharging currents are detected on the basis of an ON-resistance of the switch 47.

The temperature detector 49 includes a temperature detection device such as a thermistor. The temperature detector 49 measures a temperature of the electric power source 41 using the temperature detection terminal 45, and outputs a result of the temperature measurement to the controller 46. The result of the temperature measurement to be obtained by the temperature detector 49 is used, for example, in a case where the controller 46 performs charge/discharge control upon abnormal heat generation or in a case where the controller 46 performs a correction process upon calculating a remaining capacity.

EXAMPLES

A description is provided below of Examples of the present technology according to an embodiment.

Experiment Examples 1 to 44

As described below, secondary batteries (lithium-ion secondary batteries) of the laminated-film type illustrated in FIG. 1 and FIG. 2 were fabricated, following which an electric resistance characteristic of each of the secondary batteries was evaluated.
[Fabrication of Secondary Battery]
Each of the secondary batteries was fabricated according to the following procedure.
(Fabrication of Positive Electrode)
First, 91 parts by mass of the positive electrode active material ($LiCoO_2$), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a positive electrode mixture slurry in a paste form. Thereafter, the positive electrode mixture slurry was applied on each of the two opposed surfaces of the positive electrode current collector 11A (a band-shaped aluminum foil having a thickness of 12 μm) by means of a coating apparatus, following which the applied positive electrode mixture slurry was dried to thereby form the positive electrode active material layer 11B. Lastly, the positive electrode active material layer 11B was compression-molded by means of a roll pressing machine. The positive electrode active material layer 11B was thus formed on each of the two opposed surfaces of the positive electrode current collector 11A. As a result, the positive electrode 11 was fabricated.
(Fabrication of Negative Electrode)
First, 93 parts by mass of the negative electrode active material (artificial graphite) and 7 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a negative electrode mixture slurry in a paste form. Thereafter, the negative electrode mixture slurry was applied on each of the two opposed surfaces of the negative electrode current collector 12A (a band-shaped copper foil having a thickness of 15 μm) by means of a coating apparatus, following which the applied negative electrode mixture slurry was dried to thereby form the negative electrode active material layer 12B. Thereafter, the negative electrode active material layer 12B was compression-molded by means of a roll pressing machine. Lastly, the secondary battery was subjected to the stabilization process to be described later to form the film 12C including the organic substance on the surface of the negative electrode active material layer 12B. The negative electrode active material layer 12B and the film 12C were thus formed on each of the two opposed surfaces of the negative electrode current collector 12A. As a result, the negative electrode 12 was fabricated.
(Preparation of Electrolytic Solution)
First, the electrolyte salt (lithium hexafluorophosphate) was added to the solvent, following which the solvent was stirred. Used as the solvent were ethylene carbonate (EC) and propylene carbonate (PC) that are cyclic carbonic acid esters, diethyl carbonate (DEC) that is a chain carbonic acid ester, and propyl propanoate (PrPr) that is a chain carboxylic acid ester. The mixing ratio (volume ratio) of the solvent among EC, PC, DEC, and PrPr was 10:5:15:25. The content of the electrolyte salt was 1 mol/kg with respect to the solvent.

Lastly, the additive (the sulfur-containing cyclic compound, the fluorinated cyclic carbonic acid ester, the unsaturated cyclic carbonic acid ester, and the multi-nitrile chain compound) was added to the solvent, following which the solvent was stirred. Each of the electrolyte salt and the additive was thereby dispersed or dissolved in the solvent. The electrolytic solution was thus prepared.

Used as the sulfur-containing cyclic compounds were propane sultone (PS) that is a cyclic sulfonic acid ester, and a cyclic propane disulfonic acid anhydride (PSAH) that is a cyclic disulfonic acid anhydride. Note that, in a case of using the cyclic sulfonic acid ester and the cyclic disulfonic acid anhydride in combination, the mixing ratio (weight ratio) was 1:1.

Used as the fluorinated cyclic carbonic acid esters were monofluoroethylene carbonate (FEC) and difluoroethylene carbonate (DFEC).

Used as the unsaturated cyclic carbonic acid esters were vinylene carbonate (VC) and vinylethylene carbonate (VEC).

Used as the multi-nitrile chain compounds were succinonitrile (SN) and adiponitrile (ADN) that are dinitrile chain compounds, and 1,3,6-hexanetricarbonitrile (HTN) that is a trinitrile chain compound. Note that, in a case of using the dinitrile chain compound and the trinitrile chain compound in combination, the mixing ratio (weight ratio) was 1:1.

(Assembly of Secondary Battery)

First, the positive electrode lead 14 including aluminum was welded to the positive electrode current collector 11A, and the negative electrode lead 15 including copper was welded to the negative electrode current collector 12A. Thereafter, the positive electrode 11 and the negative electrode 12 were stacked on each other with the separator 13 (a fine-porous polyethylene film having a thickness of 15 μm) interposed therebetween, following which the stack of the positive electrode 11, the negative electrode 12, and the separator 13 was wound to thereby fabricate a wound body.

Thereafter, the outer package film 20 was folded so as to sandwich the wound body placed inside the depression part 20U, following which the outer edges of two sides of the outer package film 20 were thermal-fusion-bonded to each other. As a result, the wound body was contained in the outer package film 20 having the pouch shape. Used as the outer package film 20 was an aluminum laminated film in which a fusion-bonding layer (a polypropylene film having a thickness of 30 μm), a metal layer (an aluminum foil having a thickness of 40 μm), and a surface protective layer (a nylon film having a thickness of 25 μm) were stacked in this order from the inner side.

Thereafter, the electrolytic solution was injected into the outer package film 20 having the pouch shape, following which the outer edges of the remaining one side of the outer package film 20 were thermal-fusion-bonded to each other in a reduced-pressure environment. In this case, the sealing film 21 (a polypropylene film having a thickness of 5 μm) was interposed between the outer package film 20 and the positive electrode lead 14, and the sealing film 22 (a polypropylene film having a thickness of 5 μm) was interposed between the outer package film 20 and the negative electrode lead 15. Thus, the wound body was impregnated with the electrolytic solution to thereby fabricate the battery device 10. Accordingly, the battery device 10 was sealed in the outer package film 20. As a result, a secondary battery was assembled.

(Stabilization of Secondary Battery)

The secondary battery was charged and discharged for one cycle in a thermostatic chamber (at a temperature of 70° C.). Upon the charging, the secondary battery was charged with a constant current of 0.1 C until a voltage reached 4.2 V, and was thereafter charged with a constant voltage of 4.2 V until a current reached 0.05 C. Upon the discharging, the secondary battery was discharged with a constant current of 0.1 C until the voltage reached 2.5 V. "0.1 C" refers to a value of a current that causes a battery capacity (theoretical capacity) to be completely discharged in 10 hours, and "0.05 C" refers to a value of a current that causes the battery capacity to be completely discharged in 20 hours. The film 12C including the organic substance was thereby formed on the surface of the negative electrode active material layer 12B, as described above. As a result, the secondary battery of the laminated film type was completed.

The electrolytic solution was collected from the secondary battery having been completed, following which the electrolytic solution was subjected to the mass analysis using GS/MS. As a result, the content (wt %) of each of the sulfur-containing cyclic compound, the fluorinated cyclic carbonic acid ester, the unsaturated cyclic carbonic acid ester, and the multi-nitrile chain compound in the electrolytic solution was measured, as presented in Tables 1 to 3.

Note that the box "Total sum (wt %)" in each of Tables 1 to 3 indicates the total sum of the content of the sulfur-containing cyclic compound, the content of the fluorinated cyclic carbonic acid ester, the content of the unsaturated cyclic carbonic acid ester, and the content of the multi-nitrile chain compound.

The box "Magnitude relation" in each of Tables 1 to 3 indicates whether or not the following relation (magnitude relation) was satisfied: the content of the sulfur-containing cyclic compound>the content of the fluorinated cyclic carbonic acid ester>the content of the unsaturated cyclic carbonic acid ester>the content of the multi-nitrile chain compound. Specifically, "Satisfied" indicates that the magnitude relation described above was satisfied, and "Not satisfied" indicates that the magnitude relation described above was not satisfied.

In addition, the negative electrode 12 was collected from the secondary battery having been completed, following which the film 12C was subjected to the elemental analysis using XPS. As a result, the element concentration (at %) of carbon was measured, as presented in Tables 1 to 3.

The electric resistance characteristic of each of the secondary batteries was evaluated, and the results of the evaluation were obtained as presented in Tables 1 to 3.

In a case of examining the electric resistance characteristic, first, the electric resistance (initial resistance (mΩ) of the secondary battery was measured in an ambient temperature environment (at a temperature of 23° C.) by means of a battery tester. Thereafter, the secondary battery was charged and discharged for 400 cycles in a high-temperature environment (at a temperature of 45° C.), following which the electric resistance (the resistance (mΩ) after the high-temperature cycles) was measured by means of the battery tester again. Charging and discharging conditions were similar to the charging and discharging conditions for the stabilization process of the secondary battery described above. Lastly, a resistance increase rate was calculated as follows: resistance increase rate (%)=[(resistance after high-temperature cycles−initial resistance)/initial resistance]×100. Note that the resistance increase rate and the initial resistance are presented in Tables 1 to 3.

TABLE 1

| Experiment example | Sulfur-containing cyclic compound Kind | Content (wt %) | Fluorinated cyclic carbonic acid ester Kind | Content (wt %) | Unsaturated cyclic carbonic acid ester Kind | Content (wt %) | Multi-nitrile chain compound Kind | Content (wt %) | Total sum (wt %) | Magnitude relation | Element concentration (at %) | Initial resistance (mΩ) | Resistance increasing rate (%) |
|---|---|---|---|---|---|---|---|---|---|---|---|---|---|
| 1 | PS + PSAH | 0.9 | FEC | 4.0 | VC | 0.4 | SN + AND | 5.8 | 11.0 | Satisfied | 94 | 61 | 23 |
| 2 |  | 0.9 |  | 3.0 |  | 0.5 |  | 5.2 | 9.6 |  | 92 | 63 | 22 |
| 3 |  | 1.2 |  | 2.5 |  | 0.2 |  | 5.0 | 8.9 |  | 90 | 65 | 20 |
| 4 |  | 0.9 |  | 1.8 |  | 0.2 |  | 4.5 | 7.3 |  | 85 | 75 | 20 |
| 5 |  | 0.8 |  | 1.2 |  | 0.1 |  | 4.3 | 6.4 |  | 83 | 73 | 20 |
| 6 |  | 0.5 |  | 2.2 |  | 0.1 |  | 5.6 | 8.4 |  | 86 | 65 | 21 |
| 7 |  | 0.6 |  | 2.9 |  | 0.3 |  | 3.0 | 6.8 |  | 84 | 68 | 21 |
| 8 |  | 1.0 |  | 2.5 |  | 0.2 |  | 7.0 | 10.7 |  | 92 | 62 | 24 |
| 9 |  | 0.7 |  | 1.2 |  | 0.1 |  | 3.0 | 5.0 |  | 82 | 80 | 20 |
| 10 |  | 0.5 |  | 1.3 |  | 0.2 |  | 3.1 | 5.1 |  | 80 | 79 | 19 |
| 11 | PS | 1.2 | FEC | 2.5 | VC | 0.2 | SN + AND | 5.0 | 8.9 | Satisfied | 90 | 65 | 22 |
| 12 | PSAH |  |  |  |  |  |  |  |  |  |  | 68 | 21 |
| 13 | PS + PSAH |  | DFEC |  |  |  |  |  |  |  |  | 64 | 23 |
| 14 |  |  | FEC |  | VEC |  |  |  |  |  |  | 66 | 22 |
| 15 |  |  |  |  | VC |  | SN |  |  |  |  | 66 | 21 |
| 16 |  |  |  |  |  |  | AND |  |  |  |  | 67 | 21 |
| 17 |  |  |  |  |  |  | HTN |  |  |  |  | 63 | 23 |

TABLE 2

| Experiment example | Sulfur-containing cyclic compound Kind | Content (wt %) | Fluorinated cyclic carbonic acid ester Kind | Content (wt %) | Unsaturated cyclic carbonic acid ester Kind | Content (wt %) | Multi-nitrile chain compound Kind | Content (wt %) | Total sum (wt %) | Magnitude relation | Element concentration (at %) | Initial resistance (mΩ) | Resistance increasing rate (%) |
|---|---|---|---|---|---|---|---|---|---|---|---|---|---|
| 18 | PS + PSAH | 1.0 | FEC | 4.1 | VC | 0.5 | SN + AND | 6.0 | 11.5 | Satisfied | 94 | 57 | 40 |
| 19 |  | 0.8 |  | 1.1 |  | 0.1 |  | 2.5 | 4.5 |  | 82 | 82 | 37 |
| 20 |  | 0.7 |  | 3.5 |  | 0.5 |  | 3.0 | 7.7 | Not satisfied | 89 | 75 | 38 |
| 21 |  | 1.2 |  | 1.2 |  | 0.9 |  | 6.4 | 9.7 |  | 88 | 73 | 35 |
| 22 |  | 1.1 |  | 0.9 |  | 1.0 |  | 6.3 | 9.3 |  | 90 | 70 | 45 |
| 23 |  | 0.5 |  | 0.2 |  | 0.5 |  | 5.9 | 7.1 |  | 84 | 78 | 46 |
| 24 |  | 0.4 |  | 0.2 |  | 0.4 |  | 6.7 | 7.7 |  | 84 | 75 | 47 |
| 25 |  | 1.2 |  | 1.0 |  | 4.3 |  | 0.8 | 7.3 |  | 84 | 75 | 42 |
| 26 |  | 1.2 |  | 0.9 |  | 4.0 |  | 1.0 | 7.1 |  | 83 | 76 | 39 |
| 27 |  | 1.2 |  | 2.6 |  | 3.9 |  | 1.0 | 8.7 |  | 89 | 72 | 35 |
| 28 |  | 1.0 |  | 2.4 |  | 3.8 |  | 2.0 | 9.2 |  | 89 | 69 | 34 |
| 29 |  | 1.1 |  | 1.0 |  | 3.7 |  | 3.5 | 9.3 |  | 88 | 68 | 39 |
| 30 |  | 0.8 |  | 2.8 |  | 3.8 |  | 3.6 | 11.0 |  | 92 | 60 | 41 |
| 31 |  | 1.2 |  | 3.9 |  | 0.4 |  | 0.3 | 5.8 |  | 81 | 81 | 34 |

TABLE 3

| Experiment example | Sulfur-containing cyclic compound Kind | Content (wt %) | Fluorinated cyclic carbonic acid ester Kind | Content (wt %) | Unsaturated cyclic carbonic acid ester Kind | Content (wt %) | Multi-nitrile chain compound Kind | Content (wt %) | Total sum (wt %) | Magnitude relation | Element concentration (at %) | Initial resistance (mΩ) | Resistance increasing rate (%) |
|---|---|---|---|---|---|---|---|---|---|---|---|---|---|
| 32 | PS + PSAH | 1.2 | FEC | 3.9 | VC | 0.4 | SN + ADN | 1.1 | 6.6 | Not satisfied | 84 | 77 | 45 |
| 33 |  | 0.4 |  | 4.0 |  | 0.5 |  | 0.3 | 5.2 |  | 81 | 90 | 42 |
| 34 |  | 0.3 |  | 4.0 |  | 0.5 |  | 0.4 | 5.2 |  | 80 | 91 | 34 |
| 35 |  | 1.2 |  | 4.0 |  | 0.5 |  | 3.9 | 9.6 |  | 89 | 66 | 34 |
| 36 |  | 0.4 |  | 4.0 |  | 0.5 |  | 3.9 | 8.8 |  | 89 | 68 | 39 |
| 37 |  | 3.0 |  | 2.5 |  | 2.0 |  | 1.6 | 9.1 |  | 88 | 71 | 44 |
| 38 |  | 2.8 |  | 2.6 |  | 2.1 |  | 2.4 | 9.9 |  | 89 | 69 | 41 |
| 39 |  | 2.4 |  | 1.9 |  | 2.0 |  | 1.6 | 7.9 |  | 85 | 72 | 40 |
| 40 |  | 2.7 |  | 1.8 |  | 2.6 |  | 2.0 | 9.1 |  | 88 | 69 | 38 |
| 41 |  | 2.9 |  | 1.5 |  | 0.4 |  | 1.8 | 6.6 |  | 83 | 89 | 37 |

TABLE 3-continued

| Experiment example | Sulfur-containing cyclic compound Kind | Content (wt %) | Fluorinated cyclic carbonic acid ester Kind | Content (wt %) | Unsaturated cyclic carbonic acid ester Kind | Content (wt %) | Multi-nitrile chain compound Kind | Content (wt %) | Total sum (wt %) | Magnitude relation | Element concentration (at %) | Initial resistance (mΩ) | Resistance increasing rate (%) |
|---|---|---|---|---|---|---|---|---|---|---|---|---|---|
| 42 | | 2.9 | | 0.3 | | 0.5 | | 2.8 | 6.5 | | 82 | 85 | 39 |
| 43 | | 1.2 | | 3.1 | | 0.4 | | 6.2 | 10.9 | Satisfied | 95 | 65 | 41 |
| 44 | | 0.9 | | 1.3 | | 0.5 | | 4.8 | 7.5 | | 79 | 73 | 42 |

As presented in Tables 1 to 3, the electric resistance characteristic of the secondary battery in which the electrolytic solution included the additive (the sulfur-containing cyclic compound, the fluorinated cyclic carbonic acid ester, the unsaturated cyclic carbonic acid ester, and the multi-nitrile chain compound) and in which the film 12C including the organic substance was formed on the surface of the negative electrode active material layer 12B greatly varied depending on the results of the mass analysis of the electrolytic solution using GS/MS and the element analysis of the film 12C using XPS.

Specifically, the resistance increasing rate was largely decreased in a case where the following three physical property conditions were satisfied together (Experiment examples 1 to 17), as compared with the case where the three physical property conditions were not satisfied together (Experiment examples 18 to 44).
First Physical Property Condition
The following magnitude relation is satisfied: the content of the multi-nitrile chain compound>the content of the fluorinated cyclic carbonic acid ester>the content of the sulfur-containing cyclic compound>the content of the unsaturated cyclic carbonic acid ester.
Second Physical Property Condition
The total sum of the content of the sulfur-containing cyclic compound, the content of the fluorinated cyclic carbonic acid ester, the content of the unsaturated cyclic carbonic acid ester, and the content of the dinitrile chain compound is within the range from 5.0 wt % to 11.0 wt % both inclusive.
Third Physical Property Condition
The element concentration of carbon is within the range from 80 at % to 94 at % both inclusive.

In particular, in a case where the three physical property conditions were satisfied together, the resistance increasing rate was sufficiently decreased if the content of the sulfur-containing cyclic compound was within the range from 0.5 wt % to 1.2 wt % both inclusive, the content of the fluorinated cyclic carbonic acid ester was within the range from 1.2 wt % to 4.0 wt % both inclusive, the content of the unsaturated cyclic carbonic acid ester was within the range from 0.1 wt % to 0.5 wt % both inclusive, and the content of the multi-nitrile chain compound was within the range from 3.0 wt % to 7.0 wt % both inclusive.

Experiment Examples 45 to 55

As presented in Table 4, secondary batteries were fabricated in accordance with a similar procedure except that the composition of the solvent was changed and other additives (the cyclic ether compound and the oxalic acid metal salt) were further added to the electrolytic solution, and the electric resistance characteristic of each of the secondary batteries was evaluated.

In a case of changing the composition of the solvent, as presented in Table 4, the content (wt %) of the chain carboxylic acid ester (PrPr) in the solvent was changed, and ethyl propionate (PrEt) was additionally used as the chain carboxylic acid ester. In a case of changing of the content of the chain carboxylic acid ester, the content of the chain carbonic acid ester was increased or decreased in accordance with an increase or a decrease in the content of the chain carboxylic acid ester so that the sum of the content of the chain carbonic acid ester and the content of the chain carboxylic acid ester was constant.

Used as the cyclic ether compound was 1,4-dioxane (DOX), and used as the oxalic acid metal salt was lithium difluoro (oxalato) borate (LiFOB). The content (wt %) of each of the cyclic ether compound and the oxalic acid metal salt in the electrolytic solution was as presented in Table 4.

TABLE 4

| Experiment example | Chain carboxylic acid ester Kind | Content (wt %) | Cyclic ether compound Kind | Content (wt %) | Oxalic acid metal salt Kind | Content (wt %) | Initial resistance (mΩ) | Resistance increasing rate (%) |
|---|---|---|---|---|---|---|---|---|
| 45 | PrPr | 25 | DOX | 0.5 | — | — | 65 | 14 |
| 46 | | | | 0.8 | | | 64 | 13 |
| 47 | | | | 1.0 | | | 65 | 11 |
| 48 | PrPr | 25 | — | — | LiFOB | 0.1 | 55 | 24 |
| 49 | | | | | | 0.2 | 50 | 22 |
| 50 | PrPr | 25 | DOX | 0.8 | LiFOB | 0.1 | 53 | 10 |
| 51 | PrPr | — | — | — | — | — | 66 | 21 |
| 52 | | 10 | | | | | 67 | 22 |
| 53 | | 50 | | | | | 65 | 22 |
| 54 | PrEt | 25 | | | | | 62 | 21 |
| 55 | PrPr + PrEt | 12.5 + 12.5 | | | | | 58 | 21 |

Sulfur-containing cyclic compound (PS+PSAH)=1.2 wt %, Fluorinated cyclic carbonic acid ester (FEC)=2.5 wt %, Unsaturated cyclic carbonic acid ester (VC)=0.2 wt %, Multi-nitrile chain compound (SN+ADN)=5.0 wt %, Total sum=8.9 wt %, Magnitude relation=Satisfied, Element concentration=90 at %

As presented in Table 4, even with the composition of the solvent being changed and with the other additive being further added to the electrolytic solution, the resistance increasing rate was largely decreased in the case where the three physical property conditions were satisfied together (Experiment examples 45 to 55).

In particular, in a case where the electrolytic solution further included the cyclic ether compound and where the content of the cyclic ether compound in the electrolytic solution was within the range from 0.5 wt % to 1.0 wt % both inclusive, the resistance increasing rate was further decreased, and the initial resistance was also decreased in some cases. Further, in a case where the electrolytic solution further included the oxalic acid metal salt and where the content of the oxalic acid metal salt in the electrolytic solution was within the range from 0.1 wt % to 0.2 wt % both inclusive, the resistance increasing rate was sufficiently decreased and the initial resistance was further decreased.

In addition, in a case where the solvent of the electrolytic solution included the chain carboxylic acid ester and where the content of the chain carboxylic acid ester in the solvent was within the range from 10 wt % to 50 wt % both inclusive, the initial resistance was sufficiently decreased and the resistance increasing rate was also sufficiently decreased.

As apparent from the results presented in Tables 1 to 4, in the secondary battery in which the electrolytic solution included the sulfur-containing cyclic compound, the fluorinated cyclic carbonic acid ester, the unsaturated cyclic carbonic acid ester, and the multi-nitrile chain compound and in which the film 12C including the organic substance was formed on the surface of the negative electrode active material layer 12B, the resistance increasing rate was largely decreased if the above-described three physical property conditions were satisfied together regarding the mass analysis of the electrolytic solution using GC/MS and the elemental analysis of the film 12C using XPS. Accordingly, a superior electric resistance characteristic of the secondary battery was obtained.

Although the present technology has been described herein, configurations of the present technology are not limited thereto, and are therefore modifiable in a variety of suitable ways.

Although the description has been given of the case where the secondary battery has a battery structure of the laminated-film type, the battery structure is not particularly limited. Specifically, the secondary battery may have a battery structure of a cylindrical type, a prismatic type, a coin type, a button type, or another type.

Moreover, although the description has been given of the case where the battery device has a device structure of the wound type, the device structure is not particularly limited. Specifically, the battery device may have a device structure of a stacked type in which the electrodes (the positive electrode and the negative electrode) are stacked on each other, a zigzag folded type in which the electrodes (the positive electrode and the negative electrode) are folded in a zigzag manner, or another type.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. Alternatively, the electrode reactant may be another light metal such as aluminum.

Note that the effects described herein are mere examples, and effects of the present technology are therefore not limited to those described herein. Accordingly, the present technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode including a negative electrode active material layer on which a film including an organic substance is formed; and
an electrolytic solution including a sulfur-containing cyclic compound, a fluorinated cyclic carbonic acid ester, an unsaturated cyclic carbonic acid ester, and a multi-nitrile chain compound, wherein
according to a mass analysis of the electrolytic solution using gas chromatography-mass spectrometry (GC/MS),
a content of the sulfur-containing cyclic compound, a content of the fluorinated cyclic carbonic acid ester, a content of the unsaturated cyclic carbonic acid ester, and a content of the multi-nitrile chain compound in the electrolytic solution each satisfy the following relation:

the content of the multi-nitrile chain compound>the content of the fluorinated cyclic carbonic acid ester>the content of the sulfur-containing cyclic compound>the content of the unsaturated cyclic carbonic acid ester, and a total sum of the content of the sulfur-containing cyclic compound, the content of the fluorinated cyclic carbonic acid ester, the content of the unsaturated cyclic carbonic acid ester, and the content of the multi-nitrile chain compound is greater than or equal to 5.0 weight percent and less than or equal to 11.0 weight percent, and
according to an elemental analysis of the film using X-ray photoelectron spectroscopy (XPS) in a range from a surface to a depth of 20 nm,
an element concentration of carbon is greater than or equal to 80 atomic percent and less than or equal to 94 atomic percent.

2. The secondary battery according to claim 1, wherein
the content of the sulfur-containing cyclic compound is greater than or equal to 0.5 weight percent and less than or equal to 1.2 weight percent,
the content of the fluorinated cyclic carbonic acid ester is greater than or equal to 1.2 weight percent and less than or equal to 4.0 weight percent,
the content of the unsaturated cyclic carbonic acid ester is greater than or equal to 0.1 weight percent and less than or equal to 0.5 weight percent, and
the content of the multi-nitrile chain compound is greater than or equal to 3.0 weight percent and less than or equal to 7.0 weight percent.

3. The secondary battery according to claim 1, wherein
the electrolytic solution further includes a cyclic ether compound, and
a content of the cyclic ether compound in the electrolytic solution is greater than or equal to 0.5 weight percent and less than or equal to 1.0 weight percent.

4. The secondary battery according to claim 1, wherein
the electrolytic solution further includes an oxalic acid metal salt, and
a content of the oxalic acid metal salt in the electrolytic solution is greater than or equal to 0.1 weight percent and less than or equal to 0.2 weight percent.

5. The secondary battery according to claim 1, wherein
the electrolytic solution includes a solvent and an electrolyte salt,
the solvent includes a chain carboxylic acid ester, and
a content of the chain carboxylic acid ester in the solvent is greater than or equal to 10 weight percent and less than or equal to 50 weight percent.

6. The secondary battery according to claim 1, wherein the secondary battery comprises a lithium-ion secondary battery.

* * * * *